US007047326B1

(12) United States Patent
Crosbie et al.

(10) Patent No.: US 7,047,326 B1
(45) Date of Patent: May 16, 2006

(54) USE OF A REMOTE CONTROL WITH A DEVICE HAVING A BUILT-IN COMMUNICATION PORT

(75) Inventors: John Crosbie, Fremont, CA (US); Shrikant Acharya, Fremont, CA (US); Anoop Balakrishnan, Fremont, CA (US); Cheyyur Jaya Anand, Fremont, CA (US)

(73) Assignee: Harman International Industries, Inc., Northridge, CA (US)

( * ) Notice: Subject to any disclaimer, the term of this patent is extended or adjusted under 35 U.S.C. 154(b) by 315 days.

(21) Appl. No.: 10/066,330

(22) Filed: Jan. 31, 2002

(51) Int. Cl.
*G06F 3/00* (2006.01)
(52) U.S. Cl. .............................. 710/16; 710/8; 710/20; 710/36; 710/72
(58) Field of Classification Search .................. 710/72, 710/36, 20, 8, 15, 16
See application file for complete search history.

(56) References Cited

U.S. PATENT DOCUMENTS

| 6,195,589 | B1* | 2/2001 | Ketcham ..................... 700/28 |
| 2001/0005197 | A1* | 6/2001 | Mishra et al. ............... 345/100 |
| 2002/0010925 | A1* | 1/2002 | Kikinis ......................... 725/39 |

FOREIGN PATENT DOCUMENTS

WO   WO 94/22242   *   9/1994
WO   WO 01/27895   *   4/2001

OTHER PUBLICATIONS

TSOP 18..SS3V "Photo Modules for PCM Remote Control Systems" Vishay Document No. 82052 (2001) pp. 1-7.
"Sony Control-S Protocol Specifications", downloaded Jan. 22, 2002 from <http://www.armory.com/~spcecdt/remote/control-S>, 5 pages.

(Continued)

*Primary Examiner*—Jeffrey Gaffin
*Assistant Examiner*—Alan S. Chen
(74) *Attorney, Agent, or Firm*—Brinks Hofer Gilson & Lione

(57) ABSTRACT

A signal from a remote control is used to operate a device having a built-in communication port and a built-in microprocessor, even though the port does not normally recognize the signal. Specifically, even if the port flags an error during decoding of information from the remote control signal, the microprocessor ignores the error and uses the decoded information in the normal manner. Therefore, the microprocessor recognizes a pattern formed at the communication port by a signal emitted by the remote control, e.g. to identify a button on the remote control that has been pressed. During the recognition process, the port flags one or more errors (such as framing error, parity error), and such errors are ignored by the microprocessor. Programming the microprocessor to ignore errors from the port allows the device to operate with signals in a format different from the format normally recognized by the port. When use of the remote control is completed, the device may be returned to normal operation, wherein erroneous information is rejected.

22 Claims, 14 Drawing Sheets

OTHER PUBLICATIONS

"Seeking IR remote control specifications", downloaded Jan. 22, 2002 from <http://www.armory.com/~spcecdt/remote/RC5codes>, 4 pages.

"Summary: RCA IR remote", downloaded Jan. 22, 2002 from <http://www.armory.com/~spcecdt/remote/RCAremote>, 2 pages.

"A Serial Infrared Remote Controller", downloaded Jan. 22, 2002 from <http://www.armory.com/~spcecdt/remote/remote.html>, 3 pages.

"Universal IR Controller for a PC", downloaded Jan. 22, 2002 from <http://www.geocites.com/SiliconValley/Lakes/7156/ir.htm>, 2 pages + picture from <http://www.geocites.com/SiliconValley/Lakes/7156/ir.jpg> 1 page.

"Serial IR experience", downloaded Jan. 22, 2002 from <http://www.armory.com/~spcecdt/remote/ir_experience.html>, 3 pages.

* cited by examiner

USE OF A REMOTE CONTROL WITH A DEVICE HAVING A BUILT-IN COMMUNICATION PORT

CROSS-REFERENCE TO RELATED APPLICATION

This application is related to and incorporates by reference herein in its entirety the commonly-owned U.S. patent application Ser. No. 10/066,402 filed on Jan. 31, 2002 by inventors John Crosbie, et al., and titled "TRANSFER OF IMAGES TO A MOBILE COMPUTING TOOL."

CROSS-REFERENCE TO SOFTWARE APPENDIX

Appendix A contains the following files in one CD-ROM (of which two identical copies are attached hereto), and is a part of the present disclosure and is incorporated by reference herein in its entirety:

```
Volume in drive D is 020131_1057
   Volume Serial Number is E7B9-5C40
   Directory of d:\
01/31/02 10:57a      <DIR>            .
01/31/02 10:57a      <DIR>            ..
01/31/02 10:49a                   685 GETCMD.C
01/31/02 10:44a                 5,544 RCDEC.VHP
01/31/02 10:49a                11,932 REMOTE.C
01/31/02 10:49a                 1,019 REMOTE.H
01/31/02 10:49a                 4,176 REMOTE~1.C
01/31/02 10:49a                 5,006 REMOTE~2.C
01/31/02 10:49a                 5,860 REMOTE~3.C
01/31/02 10:49a                 6,418 REMOTE~4.C
          10 File(s)           40,640 bytes
   Total Files Listed:
          10 File(s)           40,640 bytes
                                    0 bytes free
```

The files of Appendix A form source code of computer programs and related data of several illustrative embodiments of the present invention

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to recognition of a signal from a remote control by a communication port.

BACKGROUND

Remote controls are used to control the operation of various consumer electronics, such as a television (TV), a video cassette recorder (VCR), and a digital video disk (DVD). Many such remote controls transmit an infrared signal that is obtained by pulse period modulation (PPM) or alternatively known as space width modulation (SWM) or variable space modulation (VSM) of a carrier wave (e.g. oscillating at 38 kHz). As illustrated in FIG. 1A, a bit of value zero (0) is indicated in the signal by a pulse 1 of the carrier for a duration H0 followed by a low period of duration L0, for total length of 1.12 milliseconds. Similarly, a bit of value one (1) is also indicated by a pulse 2 of the carrier for a duration H1 followed by a low period of duration L1, for total length of 2.24 milliseconds. The pulse duration is normally the same, e.g. H0=H1 regardless of the bit's value being zero or one. As illustrated in FIG. 1A, the only difference between representation of these two bits is the duration of the low periods L0 and L1 (wherein L1>L0).

Each touch of a button on the remote control results in transmission of a header 3 (FIG. 1B) which lasts 9 milliseconds, followed by a quiet period of 4.5 milliseconds, followed by a variable length data transmission (labeled as bits A0–A15 in FIG. 1B) lasting 45 milliseconds to 63 milliseconds that identifies the remote control (also called "remote control identifier"). Bits A0–A15 are followed by another variable length data transmission (of similar duration) that identifies a button that was pressed on the remote control (also called "button identifier"). The button identifier normally includes two portions: an 8 bit key code (labeled D0–D7 in FIG. 1B) followed by an inverse of the 8 bit key code (labeled ~D0–D7 in FIG. 1B). For example, if the key code that was encoded in bits D0–D7 was of value "A1" (in hexadecimal), then the value "5E" which is the inverse of value "A1" is transmitted immediately thereafter. In this example, the button identifier is transmitted as "A15E."

Computers of the prior art may have a built-in port in conformance with the IrDA standard which is described in, for example, the following documents, each of which is incorporated by reference herein in its entirety: serialinterface.pdf, PointandShootvlp1.pdf, and IrDA_Dongle_Vlp2.pdf, from the Infrared Data Association (SM) (from www.irda.org).

When a remote control is operated in the vicinity of a computer's IrDA port, a photodiode in the port may sense the signal emitted by the remote control. However, the remote control signal is not decoded correctly by the IrDA port for a number of reasons, e.g. due to difference in modulation schemes, difference in baud rate, and difference in byte encoding (e.g. presence/absence of start bit, stop bit and parity bit). Therefore, the IrDA port normally rejects a remote control signal, for not conforming to the IrDA format. Such rejection ensures that communication between two IrDA compliant devices is not disturbed by stray noise from remote controls and other devices.

It is known in the prior art to custom build circuitry 5 in a computer to receive signals generated by a remote control as described in the following documents, each of which is incorporated by reference herein in its entirety: remote.html and ir_experience.html (from www.armory.com).

However, such custom circuitry is relatively expensive to build, cumbersome and not easily available to the average user. Therefore computers currently are not normally operated by a remote control, as easily as consumer electronics.

SUMMARY

In accordance with the invention, a device having a communication port receives, decodes and uses in the normal manner data from a signal that is in a format different from a format recognized by the communication port. When the device is to be operated with such an incompatible format signal, a microprocessor included in the device is programmed to ignore any errors that may be flagged by the communication port. For example, the communication port may flag a framing error if a portion of the sensed signal does not have the value of a stop bit, and even in the presence of such a framing error, the microprocessor uses the data generated by the port, to identify an operation to be performed by the device. When use of the device with such an incompatible format signal is completed, the microprocessor returns to normal operation, and rejects any erroneous data that is thereafter received.

DETAILED DESCRIPTION

Figure 1A:
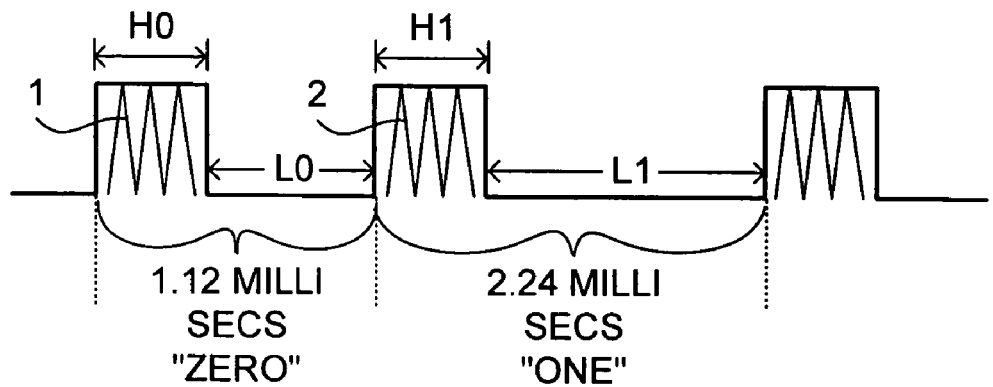
FIGS. 1A and 1B illustrate, in timing charts, format of a remote control signal well known in the prior art.

In accordance with the invention, a device 20 (FIG. 2) having a built-in communication port 21 receives, decodes and uses in the normal manner a signal 30 that is sensed even though signal 30 is transmitted by a remote control 10 in a format (also called "transmission format") different from a format (also called "reception format") recognized by built-in communication port. Although in one specific embodiment described below, signal 30 is in a prior art format illustrated in FIGS. 1A and 1B, any other remote control signal may be used with such a device 20 (such as the signal generated by a garage door opener) depending on the embodiment.

When device 20 is to be operated with such a signal 30 having a format incompatible with port 21, a microprocessor (not shown in FIG. 2) built into device 20 is programmed to ignore any errors flagged by the built-in communication port 21. For example, the communication port 21 may flag a framing error (and/or in some embodiments a parity error) if a portion of the sensed signal input does not conform to the reception format implemented by circuitry in port 21 that decodes the sensed signal.

Therefore, even if an error has been flagged by built-in communication port 21, the microprocessor uses the error-prone data generated by built-in communication port 21, e.g. in pattern recognition to identify the data that was encoded in signal 30 or a button that was pressed in case of a remote control signal. When use of device 20 with such an incompatible format signal is completed, the microprocessor returns to normal operation (wherein errors flagged by the built-in communication port 21 are no longer ignored), and rejects any erroneous data that is thereafter received.

In one embodiment, device 20 is a handheld device, such as a Personal Digital Assistant (PDA), and the built-in communication port conforms to the IrDA standard, and in one specific example, includes an Universal Asynchronous Receiver Transmitter (UART), and the UART includes a 16 byte deep buffer.

Instead of using a PDA as device 20, a personal computer (PC) can be used in other embodiments. In one particular embodiment, a remote control signal 30 in pulse period modulation (PPM) format is sensed by IrDA circuitry in the built-in communication port 21, which flags several errors (such as framing errors (and/or in some embodiments parity errors)). As noted below, instead of IrDA, any other infrared port may be used to receive such an incompatible format signal.

Also, using the principles described herein; other embodiments of such a device 20 may have a communication port 21 in conformance with any other data communication protocol, such as 802.11 (a), 802.11 (b), and BLUETOOTH, and still communicate with a remote control 10, as long as port 21 can sense the signal 30.

In one embodiment, a microprocessor 22 (FIG. 3) in device 20 is programmed with software 26 for interfacing with a remote control (hereinafter "remote control driver"). Remote control driver 26 is normally held in a memory 25 (also included in device 20) along with other drivers, such as port driver 29 that is normally used with communication port 21. In one specific example, port driver 29 functions in accordance with the IrDA standard (described above), for use of port 21 with IrDA signals. In contrast, remote control driver 26 of one embodiment does not contain IrDA specific software. Morover, remote control driver 26 controls the communication port 21 directly, without using a protocol of the type needed with IrDA When invoked, remote control driver 26 performs one or more initialization acts, illustrated by act 40 in FIG. 4. In one embodiment, remote control driver 26 saves the context of port 21 in memory 25 (FIG. 3) in storage elements 27 (hereinafter "context store"). The context of port 21 may include one or more parameters normally used to operate port 21, such as the baud rate.

In addition to or instead of the act of saving, remote control driver 26 may lock the use of port 21 e.g. by setting a flag 28 (also called "port lock"; see FIG. 3) maintained by the operating system, indicating that port 21 is in use. Locking of port 21 prevents access by any other application or driver (such as port driver 29) while remote control driver 26 is using port 21.

Figure 4:
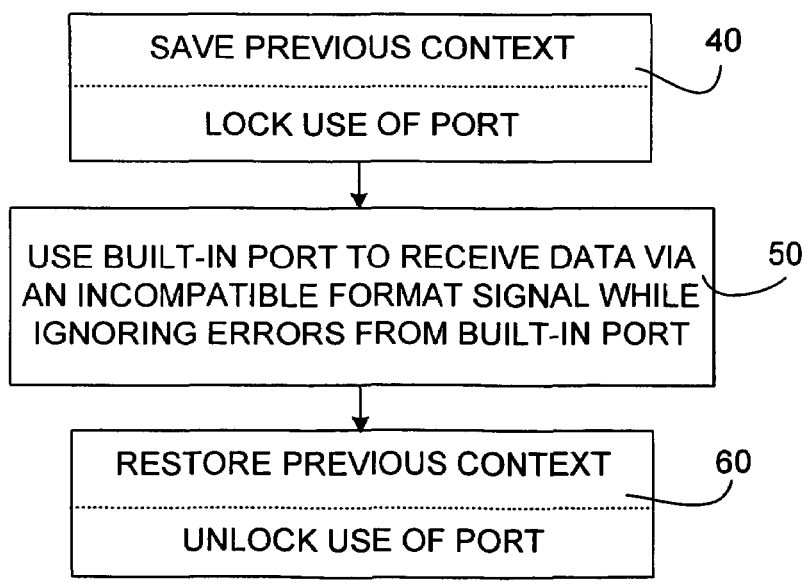
FIG. 4 illustrates, in a flowchart, acts performed by a microprocessor 22 included in the personal digital assistant of FIG. 3.

Thereafter, remote control driver 26 uses port 21 for receipt of data via a remote control signal 30, as illustrated by act 50 (FIG. 4). During sensing of signal 30 and decoding of data from signal 30, communication port 21 may flag a number of errors (such as framing error) because of incompatibility between the formats of transmission and reception. In one embodiment, there is no parity check done by communication port 21 because the parity check function is disabled in the hardware by setting the port to receive 8 bits data, 1 stop and no parity. Depending on the embodiment, parity check function may be enabled e.g. if during trial and error it is found that parity checking helps in generating byte values that map uniquely to button presses.

As noted above, remote control signal 30 may be pulse period modulated (PPM) or SWM (Space Width Modulation) during transmission, and may be received in the Slow Infra Red (SIR) format. The two values ZERO and ONE in FIG. 1A have the same pulse width H0 when the carrier is present, but the duration of carrier absence is being changed, and it is the low period that decides if a bit's value is a ONE or a ZERO.

During act 50 (FIG. 4), remote control driver 26 ignores any errors that are generated by port 21, and uses the data that is captured by port 21 to identify a button that has been pressed on a remote control 10. Specifically, remote control driver 26 is designed to recognize a pattern formed at the communication port 30 by a signal emitted by the remote control 10. The just-described pattern recognition is performed even though the communication port flags one or more errors (such as a framing error and/or in some embodiments a parity error) in accordance with a data communication protocol (such as RS232 which may be implemented by circuitry built into the communication port). Therefore, even if an error is flagged during receipt of a button identifier from a remote control 10 (indicating a button press), the received button identifier is used in the normal manner, e.g. to control operation of the device. Despite the decoding error that may get flagged each of the buttons on the remote results in a unique value presented to the application by the IR receiver.

Figure 2:
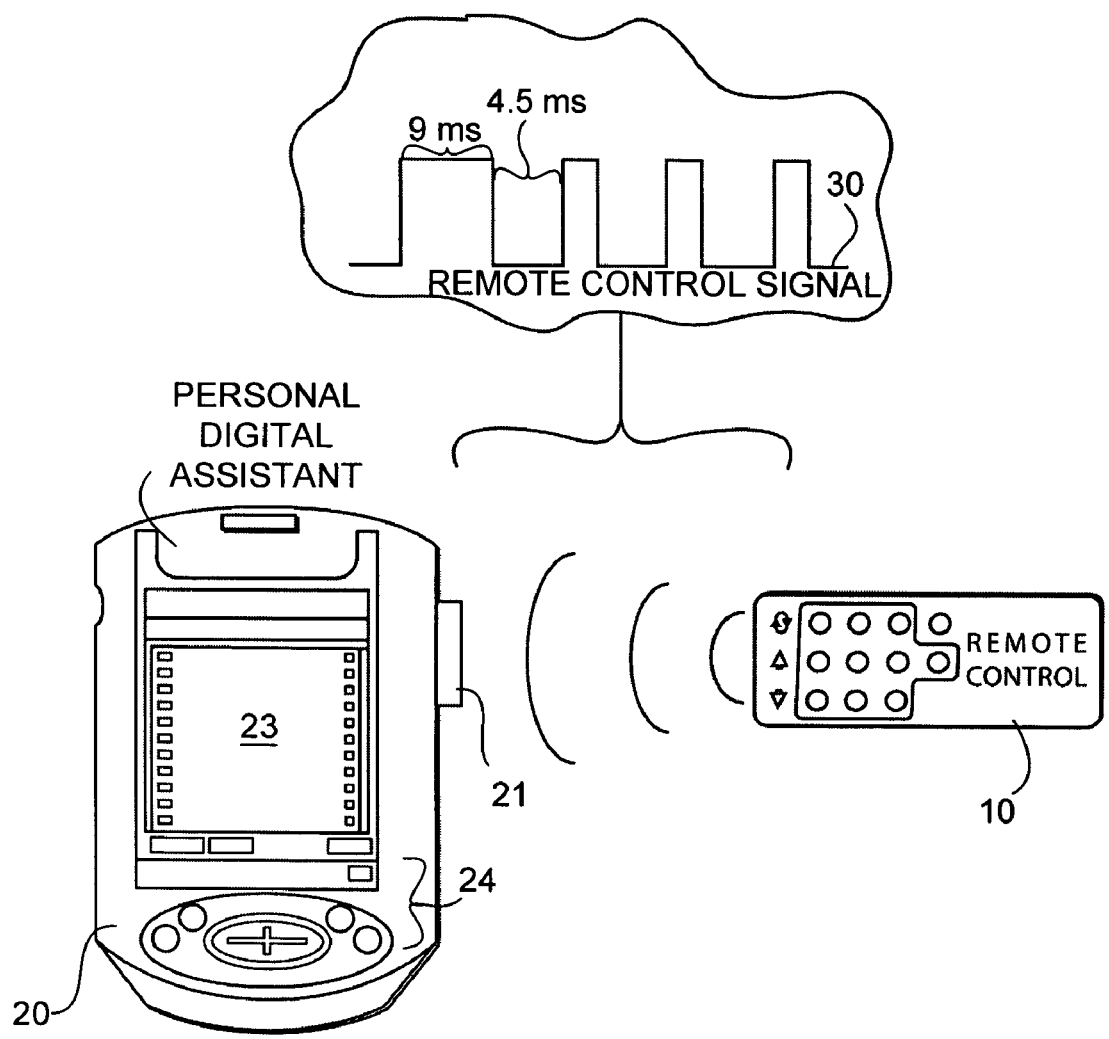
FIG. 2 illustrates, in a block diagram, the communication between a remote control 10 and a personal digital assistant (PDA) device 20 in accordance with the invention, using a remote control signal 30 that conforms to the format used in the prior art (see FIGS. 1A and 1B).

For example, in act 50 remote control driver 26 may pass the identity of a pressed button to one or more applications that are waiting for and respond to commands transmitted by remote control 10 (FIG. 2). One example of such an application is slide presentation software, which responds to a button press on a remote control 10 by changing the information displayed on a display 23.

On completion of use of remote control 10, remote control driver 26 performs one or more termination acts, as illustrated by act 60 in FIG. 4. In one embodiment, remote control driver 26 restores the previous context to port 21, e.g. by loading values from context store 27. Thereafter, remote control driver 26 unlocks the use of port 21 (by clearing port lock 28), thereby allowing normal use of port 21 by port driver 29. Port driver 29 does not ignore errors flagged by port 21, e.g. discards data that is flagged as being erroneous. The specific termination acts 60 performed by remote control driver 26 may depend on whether or not the corresponding initialization acts 40 (described above) are performed, and/or the order of their performance, depending on the embodiment as would be apparent to a skilled engineer in view of the disclosure.

Figure 5:
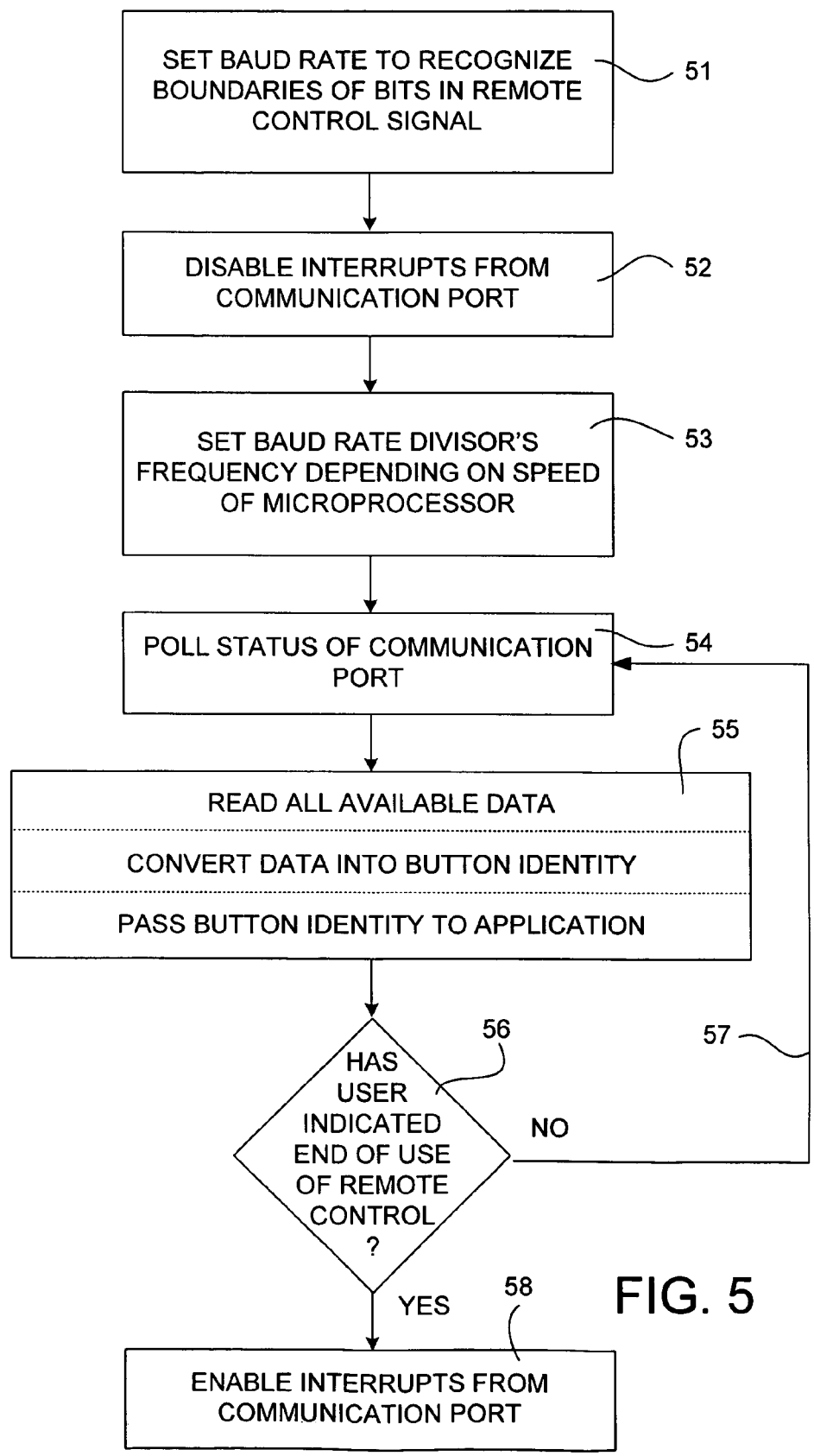
FIG. 5 illustrates, in a flowchart, acts performed by the microprocessor 22 during one implementation of act 50 of FIG. 4.

While one specific implementation of act 50 (FIG. 4) is illustrated in FIG. 5 by acts 51–58 (described below), any other implementation may be used in other embodiments, depending on the specific circuitry in device 20, as would be apparent to a skilled engineer in view of the disclosure.

In act 51 (FIG. 5), remote control driver 26 sets an appropriate baud rate for communication port 21. The baud rate is predetermined to be, e.g. the inverse of the shortest duration for which a bit is encoded in the remote control signal 30. In one specific example, a bit of value ZERO is encoded in a duration (see H0+L0 in FIG. 1A) of 1.12 milliseconds whereas a bit of value ONE is encoded in a duration (see H1+L1 in FIG. 1A) of 2.24 milliseconds. For this example, the predetermined baud rate is chosen to be 1/1.12 millisecond, which equates to 890 baud.

In one embodiment, a 925 baud rate is used uniformly across all platforms (such as MIPS based PocketPC and SH3/SH4), although 890 is the calculated baud rate. Specifically, the nearest setting to 890 that provides the best set of unique byte values in a repeatable manner is found by experiment to be 925, which works uniformly across platforms. Note, however, that 890 baud may be used in some cases, for example PocketpC ARM based processors.

In act 51 (FIG. 5), remote control driver 26 may also set other parameters of communication port 21 in preparation for reception of data via remote control signal 30, and such parameters may differ from embodiment to embodiment, as would be appropriate to the skilled engineer in view of this disclosure. Moreover, communication port 21 may be initialized in any other manner as may be required by port 21, again depending on the embodiment.

In one embodiment, in act 51, remote control driver 26 also sets communication port 21 to operate in the Slow Infrared mode, with bytes being formed of 8 bits and no parity, and each byte being preceded by a start bit of 0 and followed by a stop bit of 1. The Slow InfraRed (SIR) mode is similar to RS 232 but with the following difference: since the SIR receives remote control signal 30 in light pulses, the existence of a pulse is considered a "ZERO" value while the non existence of a pulse is taken to be a "ONE" value.

In one embodiment, communication port 21 (FIG. 3) performs sampling of a remote control signal 30 (FIG. 2) in middle of the period (also called "bit time") during which a bit is expected to be received, e.g. a period of 1.12 milliseconds. Moreover, the sampling clock operate faster, for example, 16 times in the bit time, and a number of samples (say 16 samples) are correlated to give a value ZERO or ONE to the sampled bit, based on the values of samples (e.g. the total duration H0+L0 (FIG. 1A) forms one bit time, and correspondingly the total duration H1+L1 which is twice as long forms two bit times), as discussed next.

In this embodiment, all incoming stream and decoding streams are asynchronous, and the baud rate is selected to be approximately inverse of the time H0+L0. However when a receiver in the communication port 21 samples the input data, the receiver sets the sampling time to approximately start half way through a previous bit time and end half way through the current bit time. The sampling width, e.g. from the middle of H0+L0 to the middle of ½(H1+L1), is sampled 16 times, giving 16 samples. So if during a sample width, the receiver sees a high level sample, the receiver decodes the high level sample as a zero value, and if the level is sampled as low, the symbol is taken to be a one value.

In this embodiment, when a bit of value "ONE" is transmitted by the remote control 10, the communication port 21 decodes two bits: namely a "ZERO" value and a "ONE" value. In contrast, a bit of value ZERO tranmitted by remote control 10 is decoded by communication port 21 as a bit of value "ONE".

When a signal of the type illustrated in FIG. 1A is first received, the remote has just begun to send an identifier of the remote control from a quiet period of 4.5 msec resulting in a low level in the remote control signal 30 that is being transmitted, which transalates to a value of ONE in the receiver of communication port 21. This value of ONE keeps the detection circuitry in port 21 in reset mode as the circuitry does not see a low transition to start a bit capture. Therefore the first pulse which is a "zero" after the quiet period starts the detection of the start bit. Therefore the very first pulse (during a ZERO value transmision from the remote control) after a quiet period is translated into a start bit, and the start bit is not captured as a data bit. Instead, the next bit (whenever it arrives) forms the first bit of a byte. Note that a 16X sampling during the sampling period as described in the previous paragraph does not indicate raising of the baud rate. The baud rate is in the region of 890, in this example.

If the baud rate is changed to other values, then the capture of data by communication port 21 may become unpredictable from sample to sample for a number of reasons: e.g. a bit time's boundary may start coinciding with the pulses. Coincidence of start boundary of a bit time with a pulse causes decoding of the values of bits to be unpredictable (and for this reason, sampling periods are started in the middle of a bit time). Due to such problems, fewer bytes get decoded, and the decoded bytes may no longer properly distinguish between signals generated by different button presses on remote control 10. For this reason, the baud rate may be manually selected, by trial and error, to repeatably obtain a unique value for each button press on remote control 10.

In one embodiment, during act 52 (FIG. 5), remote control driver 26 disables interrupts from communication port 21 to the rest of the operating system, so that no other driver is aware of the transactions between communication port 21 and remote control driver 26. Therefore, port driver 29 is effectively disabled at this stage, and no application can communicate with communication port 21 other than via remote control driver 26. Act 52 can be implemented differently in other embodiments, to ensure that any errors generated by port 21 during receipt of an incompatible format signal are ignored.

Figure 3:
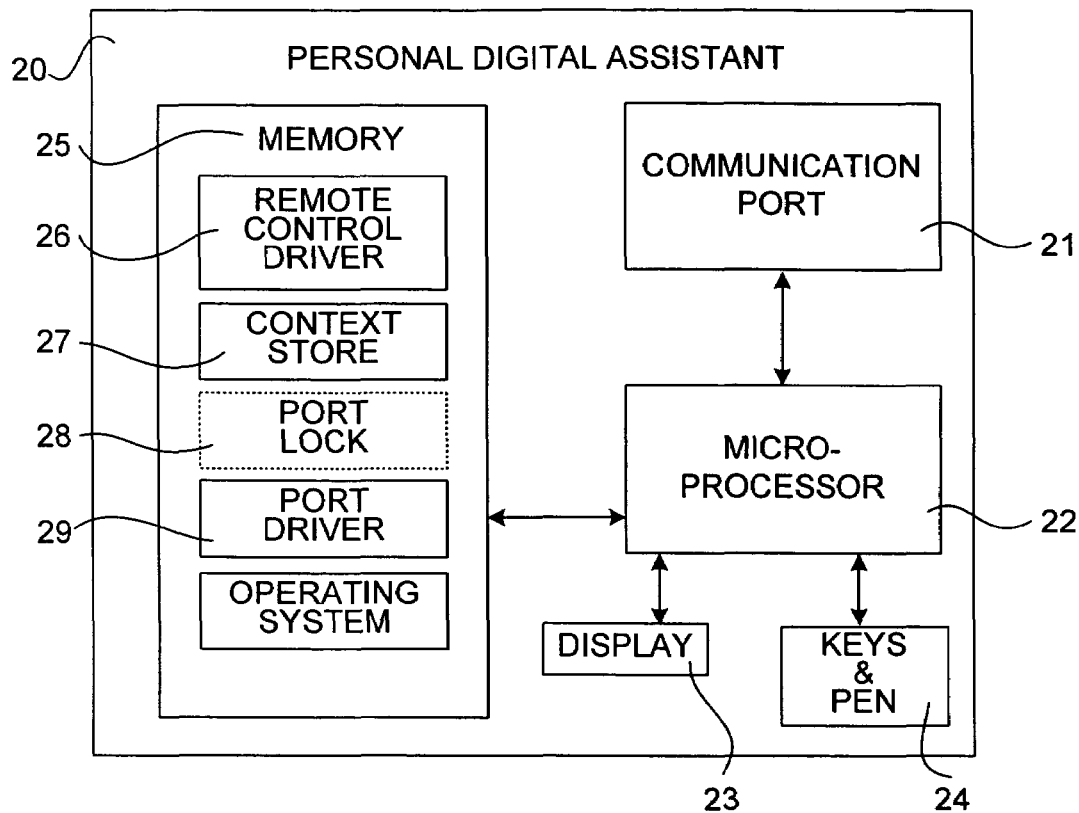
FIG. 3 illustrates, in a block diagram, various components included in the personal digital assistant of FIG. 2.

In one embodiment, during act 53 (FIG. 5), remote control driver 26 sets the value of the baud rate divider in communication port 21, depending on the speed of the microprocessor 22 (FIG. 3). For example, the baud rate divider may be set to the value 64 for a 32 MHz processor and to the value 32 for a 16 MHz processor. Typically processor clocks in device 20 may run at several MegaHertz frequency. In order to calculate the baud rate which is a fraction of the processor clock frequency, the baud rate clock is derived by dividing the processor clock frequency by a suitable number in the baud rate divider.

In one embodiment, during act 54 (FIG. 5), remote control driver 26 polls the status of communication port 21, e.g. checks the status bits in communication port 21 to see if any data has been received. If no data has been received, remote control driver 26 waits for a predetermined period, and again polls the status of communication port 21. The polling act 54 is repeated at a time interval of, for example, twice the frequency indicated by the baud rate set in act 51.

In one specific example, polling act 54 is repeated every 250 milliseconds, to look at a buffer in communication port 21 and retrieve all the characters captured therein. Characters get captured in the buffer regardless of the fact there may a framing error. The framing error is just a flag which is set by communcation port 21 and this flag is ignored as described elsewhere herein. Therefore, all captured characters go into the buffer.

Figure 1B:
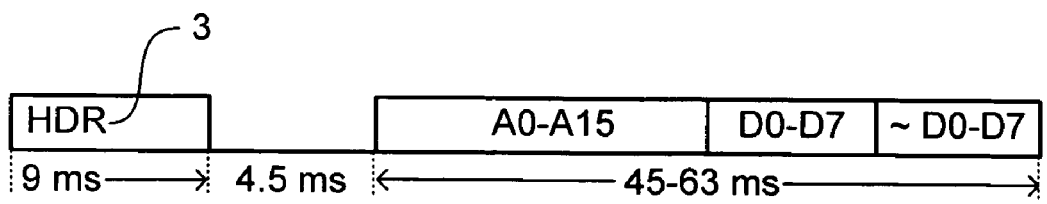

Communication port 21 in a typical PDA has standard buffer of 16 bytes, so a maximum of 16 characters can be accumulated before overflow. As illustrated in FIG. 1B, a typical tranmission of a single button press code by remote control 10 creates two bytes in the input buffer and takes roughly 58.5 ms–76.5 ms. So the time it will take to fill the buffer (also called "input character buffer") is in the range of 58.5*8=468 ms to 76.5*8=612 ms. Therfore the polling act 54 is set up to poll the buffer every 250 ms and therefore does not allow the buffer to overflow. So the polling act 54 checks for data existence every 250 milliseconds and reads all the characters captured in the buffer, until the buffer is empty.

If communication port 21 decodes data from remote control signal 30, then in act 54 remote control driver 26 finds that data has arrived, and goes to act 55. In act 55, remote control driver 26 repeatedly retrieves the data from communication port 21 buffer, until no more data is available. In act 55, remote control driver 26 ignores any errors that may be flagged by port 21.

In one embodiment, remote control driver 26 converts the one or more bytes of data being received into the identity of a button that has been pressed on remote control 10. In one specific implementation of the conversion act, remote control driver 26 performs a table look up to identify the button press, e.g. compares one or more of the received bytes with a set of patterns in a table. The set of patterns are predetermined empirically, e.g. by trial and error, and uniquely identify a pressed button.

Once a button has been identified, remote control driver 26 supplies the button's identity to an application, for usage in the normal manner. For example, the remote control driver 26 may generate a signal to a presentation application as a command to advance to a next slide during a presentation of slides, although an error is flagged by port 21.

In one embodiment, during act 56 (FIG. 5), remote control driver 26 checks if the user has indicated end of use of remote control 10, and if not returns to act 54 (described above) via branch 57 (FIG. 5). If use of remote control 10 has ended, remote control driver 26 enables (in act 58) the interrupts that were disabled in act 52 (described above). Thereafter, one or more of acts 60 (FIG. 4) may be performed as described above, to enable port driver 29 to be used with communication port 21 in the normal manner.

While remote control driver 26 waits for receipt of data, communication port 21 receives and decodes any data from a remote control signal 30 generated by the pressing of a button on remote control 10. Specifically, communication port 21 initially looks at a bit stream generated by receipt of remote control signal 30 (sampled at the above-described baud rate) for a low transition (from a high level to a low level), and in response to the low transition looks for a start bit of 0.

Any data that may be generated prior to remote identifier A0–A15 (FIG. 1B), i.e. during receipt of a 9.0 millisecond header 3 and during the 4.5 millisecond quiet period, is discarded by remote control driver 26 (FIG. 3) during the data conversion in act 55 (FIG. 5). After receiving the start bit followed by 8 bits, if communication port 21 receives a bit of value 1, then communication port 21 concludes that this bit is the stop bit and saves the byte for transfer to microprocessor 22. However, at this stage if communication port 21 receives a bit of value 0, then communication port 21 concludes that a framing error has occurred, and sets a flag to indicate the framing error and the data captured is stored in the buffer. As noted above, such flags are ignored by microprocessor 22, when executing the software for remote control driver 26.

After receipt of the first byte as described above, if the immediate next bit is of value 0, then communication port 21 concludes that this bit is the start bit of a new byte, and continues to operate as described above. If the next bit is of value 1, then communication port 21 concludes that another framing error has occurred, this time in the start bit of a new byte, and waits for receipt of a start bit.

Figure 6:
FIG. 6 illustrates, in a timing diagram, the pulses present in a remote control signal 30, the data received at communication port 21 (FIG. 3), the interpretation by Slow Infrared interpretation of the received data, and the decoded bytes.

A signal 30 from a remote control 10 sensed and decoded by communication port 21 in the manner shown in FIG. 6.

Communication 21 contains asynchronous circuitry that is set up (as described above) for receiving eight bits with no parity, similar to the RS232 mode, and therefore decodes level changes (level 0 or level 1). However, as noted above, a low transition is required before such decoding begins. In the illustration of FIG. 6, the points where a pulse is present are seen as generating a bit of value ZERO and the points is present are seen as generating the value ONE. As indicated in FIG. 6, as soon as a level 0 is detected by the communication port 21, communication port 21 assumes a start bit reception and starts decoding. Therefore, communication port 21 decodes the value 0x0a after which communication port 21 finds no stop bit transition and assumes a framing error.

As noted above, the remote control driver 26 ignores any errors that are flagged by communication port 21. Communication port 21 continues to decode the incoming remote control signal, thereby to generate the string "0a2529a0" of which the first two bytes represent the remote identifier, so that the string "0a25" is repeated in every remote control signal that is received. Note that this string "0a25" was originally transmitted by remote control signal 10 as the string "61d6" (in hexadecimal). The next string "29a0" represents a button that has been pressed on remote control signal 10, as illustrated in detail in the following table. This value may be identified to be the button number 3.

Port 21 eventually provides a remote identifier A0–A15 (FIG. 1B) that identifies the remote control 10, and this byte (e.g. of value x0a25) is identical regardless of which button is press on remote control 10. However, each button produces a unique set of values for button identifier D0–D7 and ~D0–D7, as shown in the following table.

| Button on Remote 10 | Bytes generated by Communication Port 21 |
|---|---|
| REV | 0x1148 |
| FWD | 0x9148 |
| AUTO | 0x5121 |
| 1 | 0x09a8 |
| 2 | 0x11a4 |
| 3 | 0x29a0 |
| 4 | 0x2194 |
| 5 | 0x4990 |
| 6 | 0x5188 |
| 7 | 0xa980 |
| 8 | 0x4154 |
| 9 | 0x8950 |
| 0 | 0x2981 |
| RETURN | 0xa901 |

A number of patterns of the type listed above, which are to be recognized by microprocessor 22 (at the predetermined baud rate), are initially generated by manually pressing a corresponding number of buttons on the remote control 10, and manually noting the correspondence to form a table. Such a table needs to be generated only once, and may be stored in device 10, e.g. at a factory. Thereafter, during normal operation, each pattern received by device 10 may be looked up via the experimentally-determined table, to identify the button on remote control 10.

Figure 8A:
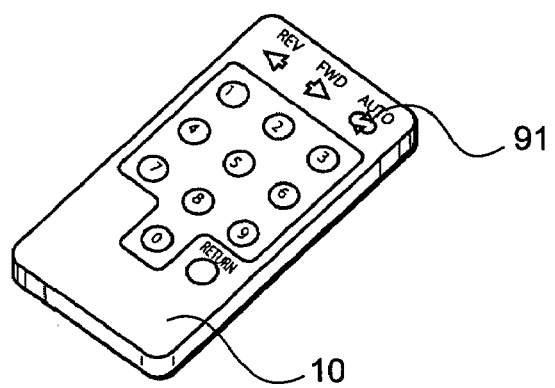
FIGS. 8A and 8B illustrate, in a perspective view and a front elevation view respectively, one specific remote control used with a PDA in accordance with the invention.
Figure 8B:
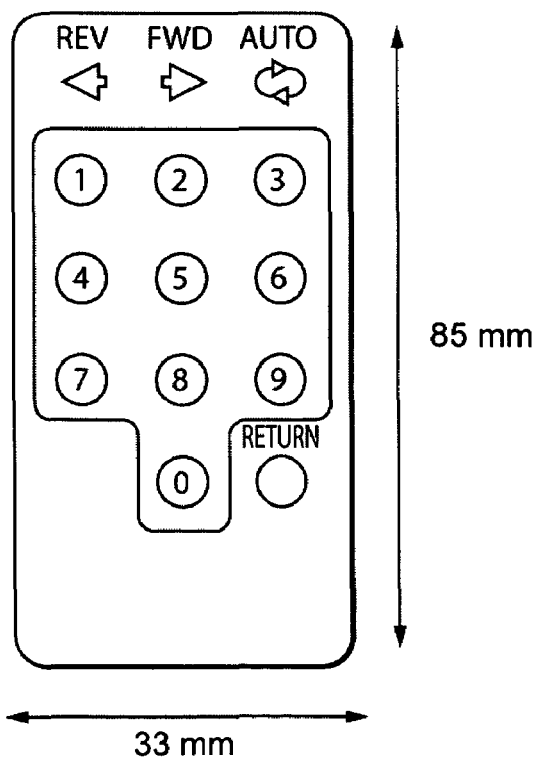

One embodiment allows a commercially available remote control unit (with not hardware or software changes thereto) to communicate with the standard IrDA receiver in the PDAs today. The signals 30 of the remote control 10 are decoded into specific numbers that are unique and then the decoded numbers are used to signal actions in the presentation application running on the PDA. This is done to reduce the cost of providing a remote control for the PDA by leveraging the manufacturing efficiencies and economies of scale inherent in the commercial production of remote controls for consumer electronics. Therefore, a $2 remote control can be used as described herein to control execution of an application in a hand-held device, such as a PDA. One such remote control is custom designed for use with presentation software as illustrated in FIGS. 8A and 8B, and in FIG. 9. In contrast, both an infrared keyboard and an infrared mouse of the prior art use IrDA port for sending the information of keystrokes or mouse directions.

Device 20 of the type described herein may be any of the following PDAs (with their respective microprocessor indicated in brackets): Handspring (Dragon Ball), IPAQ (SA1100), Cassaopiea (MIPS 4122), HP Jornada (SH3). No hardware changes need to be made to such a PDA, and instead, just software for the following acts (which software is provided in the attached appendix) is executed in the PDA, as shown below for each PDA.

Figure 7A:
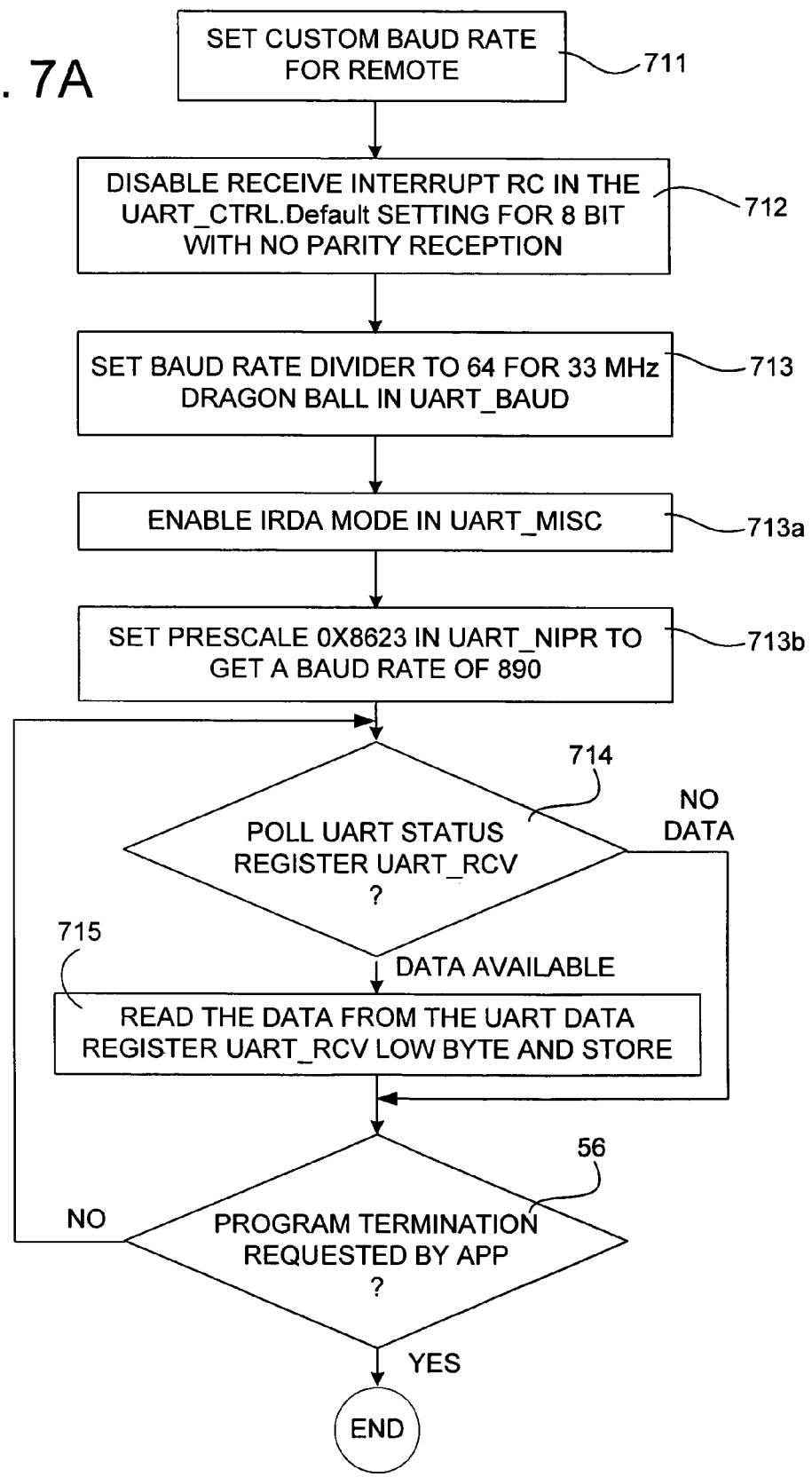
FIGS. 7A–7D illustrate, in flow chart, acts performed by different embodiments of personal digital assistants to receive a remote control signal.

FIG. 7A illustrates a flow chart for the Handspring PDA running the PALM OS and based on the Dragon Ball processor from Motorola for performing the following acts.

Act 711: Set the custom baud rate to match the remote control signal

Act 712: Disable Receiver/CTS interrupt.

Act 713: Set baud rate divisor

Act 713a: Enable IRDA mode in UART_MISC

Act 713b: SET prescale to 0x8623 in UART_NIPR register to get baud rate of 890.

Act 714: Poll the IRPort status.

Act 715: If data available read till no more data available.

Figure 7B:
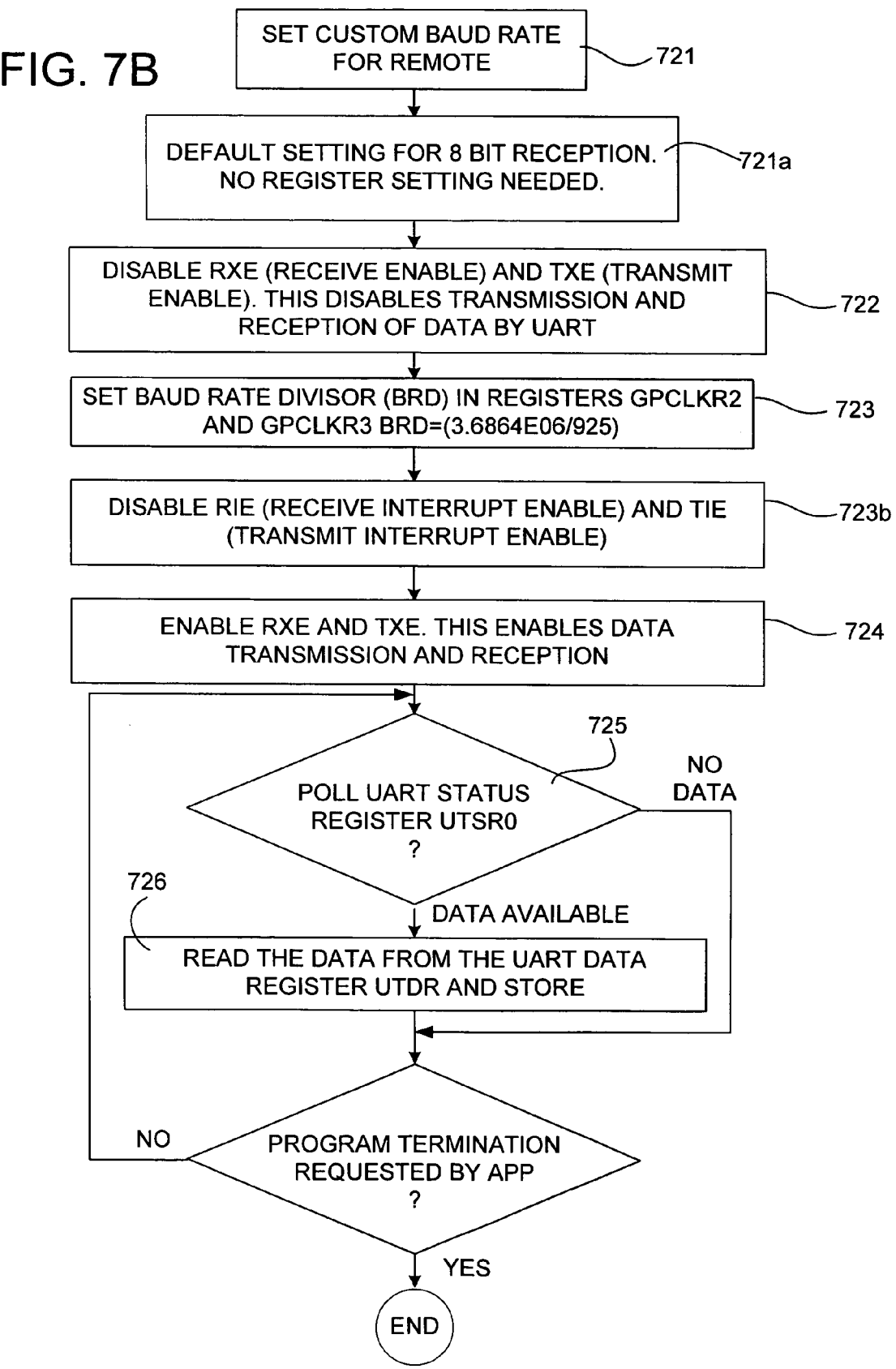

FIG. 7B illustrates a flow chart for the IPAQ PDA running the Microsoft PocketPC 2000 or 2002 running on INTEL SA11xx which performs the following acts.

Act 721: Set the custom baud rate to match the remote control signal

Act 722: Disable receive enable (RXE) and transmit enable (TXE) before setting the baud rate divisor Act 723: Set baud rate divisor Act 723 b Disable receive interrupt enable (RIE) and transmit interrupt enable (TIE) Act 724: Enable RXE and TXE Act 725: Poll the IRPort status.

Act 726: If data available read till no more data available.

Figure 7C:
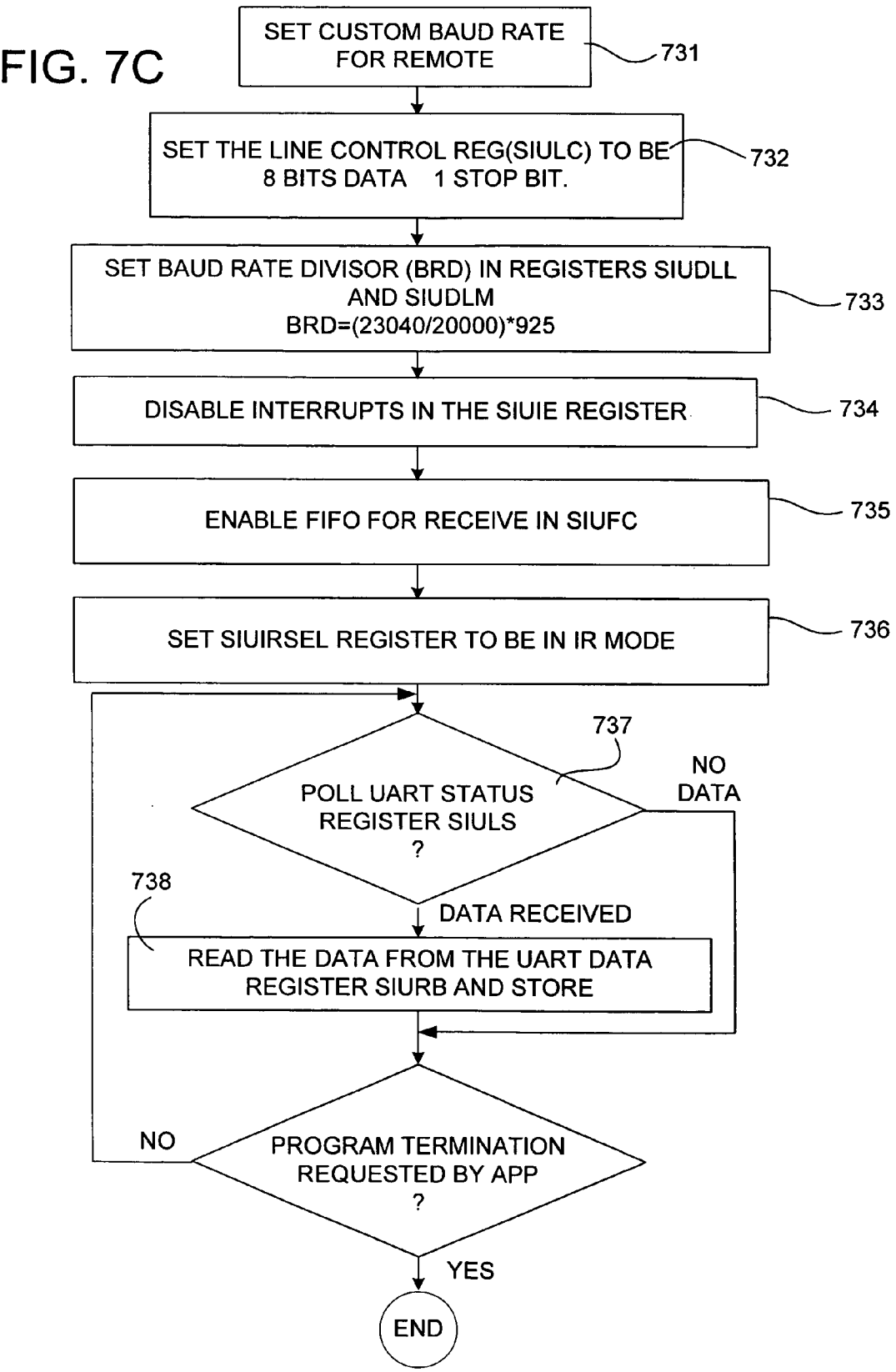

FIG. 7C illustrates a flow chart for the Cassiopeia PDA running the Pocket PC 2000 and NEC MIPS 41xx which performs the following acts.

Act 731: Set the custom baud rate to match the remote control signal

Act 732: Set the line control reg to have at 8 bits, no parity, 1 stop and also set to 1 the LCR7 bit (Line Control Register bit 7)

Act 733: Set the baud rate divisor.

Act 734: Disable the interrupts.

Act 735: Write the fifo control register to configure as 14 bytes fifo mode and enable fifo.

Act 736: Set the IRSEL register to be in IR mode (wherein IRSEL stands for Infra Red Mode Select of UART)

Act 737: Poll the IRPort status.

Act 738: If data available read till no more data available.

Figure 7D:
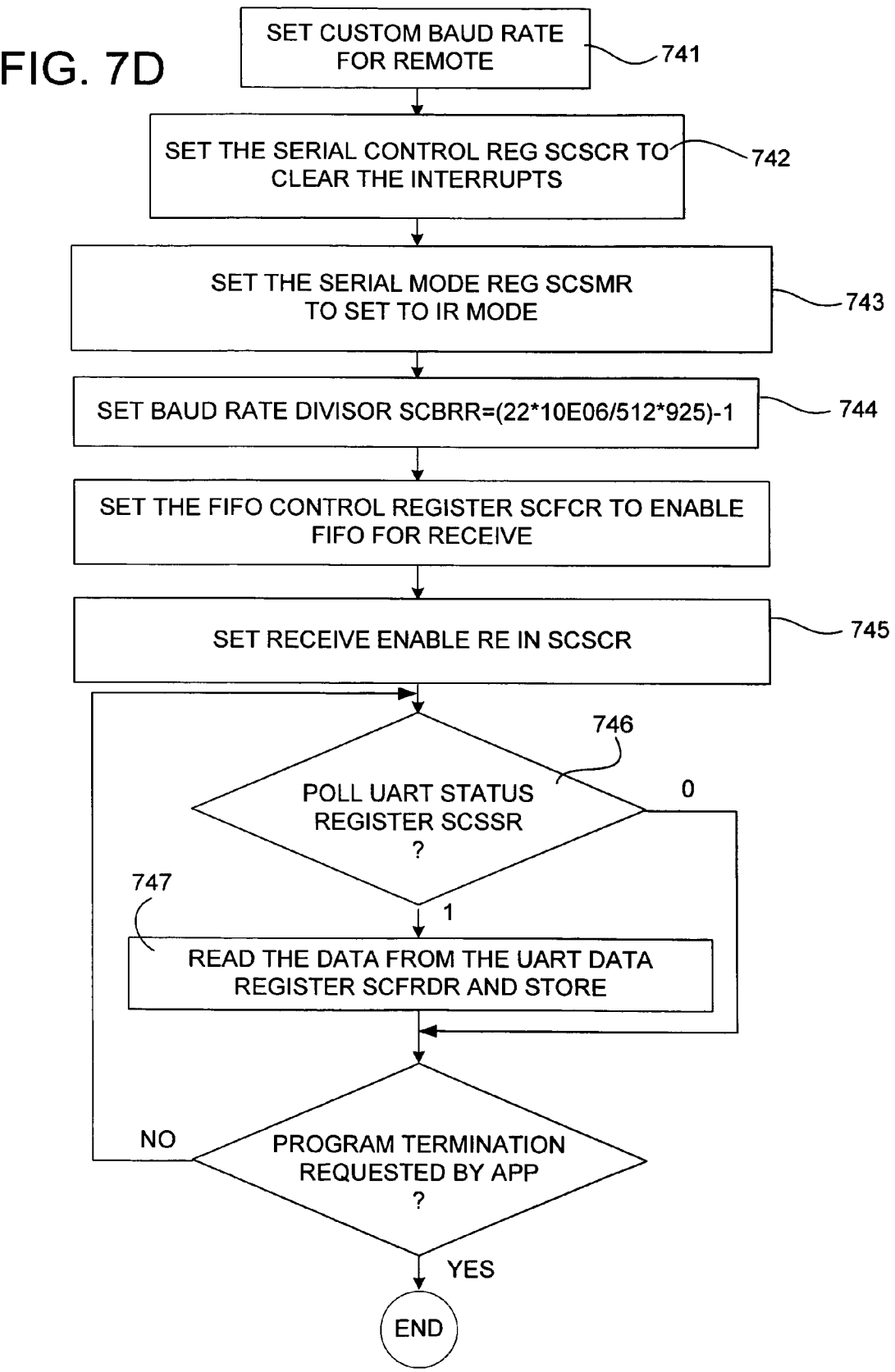

FIG. 7D illustrates a flow chart for the HP Jornada PDA Hitachi SHX running PocketPC 200X Microsoft OS which performs the following acts.

Act 741: Set the custom baud rate to match the remote control signal

Act 742: Set Serial Control Register SCSCR to Clear all interrupts. Act 743: Set the data type to IR Mode in SCSMR for 8 bits with no parity and one stop.

Act 744: Set the baud rate divisor SCBRR=((22*10E06/(512*925))−1.

Act 745: Enable receiver.

Act 746: Poll the IRPort status.

Act 747: If data available read till no more data available.

Although any remote control of the prior art may be used in accordance with the invention as described herein, in one specific embodiment, a remote control 10 (FIG. 8) has a number of buttons labeled 0–9. Moreover, although such a remote control 10 may be used with any application software in device 20, in one embodiment, remote control 10 is used with presentation software as illustrated in FIG. 9.

As would be apparent to a skilled artisan, a specific slide can be directly displayed simply by entering a number using the buttons labeled 0–9 on remote control 10. Remote control 10 of FIG. 8 also has additional buttons labeled "REV" (to go back to a previous slide), "FWD" (to go to a next slide), and "RETURN" to cause device 20 to return to displaying a last slide and also to toggle the display between two slides located anywhere in the presentation.

In the embodiment illustrated in FIG. 8, an additional button 91 is labeled with an icon of an ellipse with arrows on the long sides of the ellipse, to illustrate "AUTO" mode, for a slide show. In the "AUTO" mode, slides are automatically displayed in a looping manner one after another, with a time period between slides being preset (for example by the user's indication of the time period in the PDA). Note that in the embodiment illustrated in FIG. 8, remote control 10 does not have any other buttons, although additional buttons may be present in other embodiments.

Figure 9:
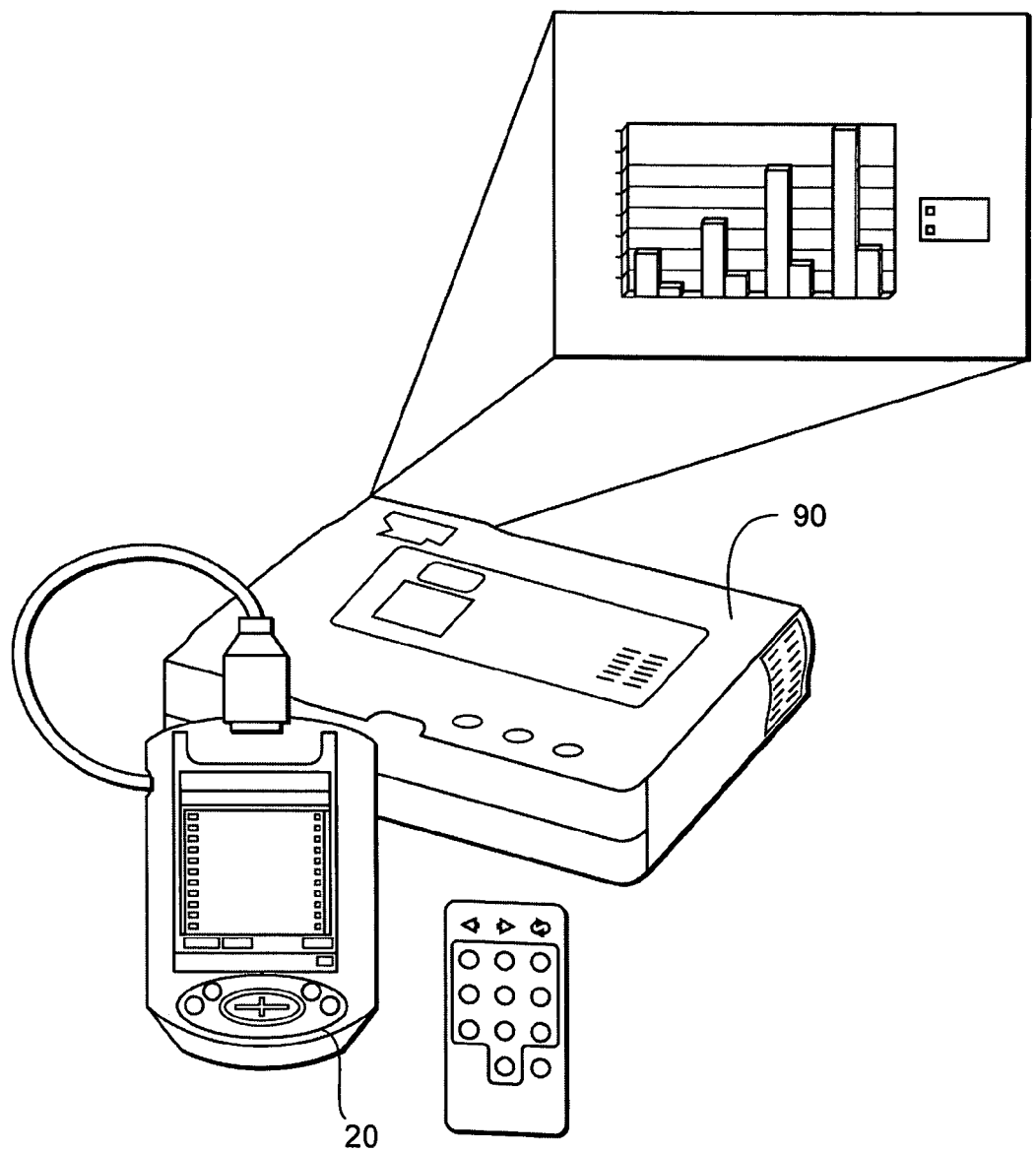
FIG. 9 illustrates, in a perspective view, use of the remote control 10 to operate a PDA 20 to generate a presentation of slides by projector 90.

For more information on use of a remote control 10 with presentation software in device 20 as illustrated in FIG. 9, see the related U.S. patent application Ser. No. 10/066,402 that is incorporated by reference above.

Use of a remote control 10 with a device 20 may be initiated by simply initiating use of presentation software in device 20. Alternatively, a menu screen may be displayed to a user to allow the user to select "Remote Control Navigation" that thereafter invokes the remote control driver 26 to begin operation. Completion of the use of the remote control 10 may be indicated to device 20, for example simply by exiting the presentation software, or alternatively by selection of another command (not shown) in a menu.

Numerous modifications and adaptations of various embodiments described herein will be apparent to the skilled engineer in view of the disclosure.

For example, a sequence of acts described above may be performed in a different order from the order described above, and one or more such acts may even be completely omitted, depending on the embodiment.

Furthermore, any non-remote control port normally built into any device (such as a laptop, desktop and server computer) may be used with any conventionally available remote control simply by executing appropriate software of the type described herein.

Note that the carrier generated by a remote control and sensed by a built-in communication port may have any frequency which is different, such as 56 kHz, 40 kHz or even 455 kHz. Moreover, the number cycles may be used to encode a bit, such as 20 cycles or 320 cycles. Therefore, any carrier frequency and any coding scheme may be used to encode data into a remote control signal, as long as corresponding software and bit patterns are used to decode the signal by a device of the type described herein.

Furthermore, although port 21 is described above as being a built-in component of device 20 in some embodiments, in other embodiments port 21 is built into a removable card (such as a CompactFlash (CF) card) that can be inserted into and used with such a device 20. In one embodiment, a remote control driver 26 is also stored on the removable card that contains such a port 21, for concurrent use of both. Such a port 21 may have a fixed baud rate that is preset to be the baud rate for use with the remote control.

Figure 10A:
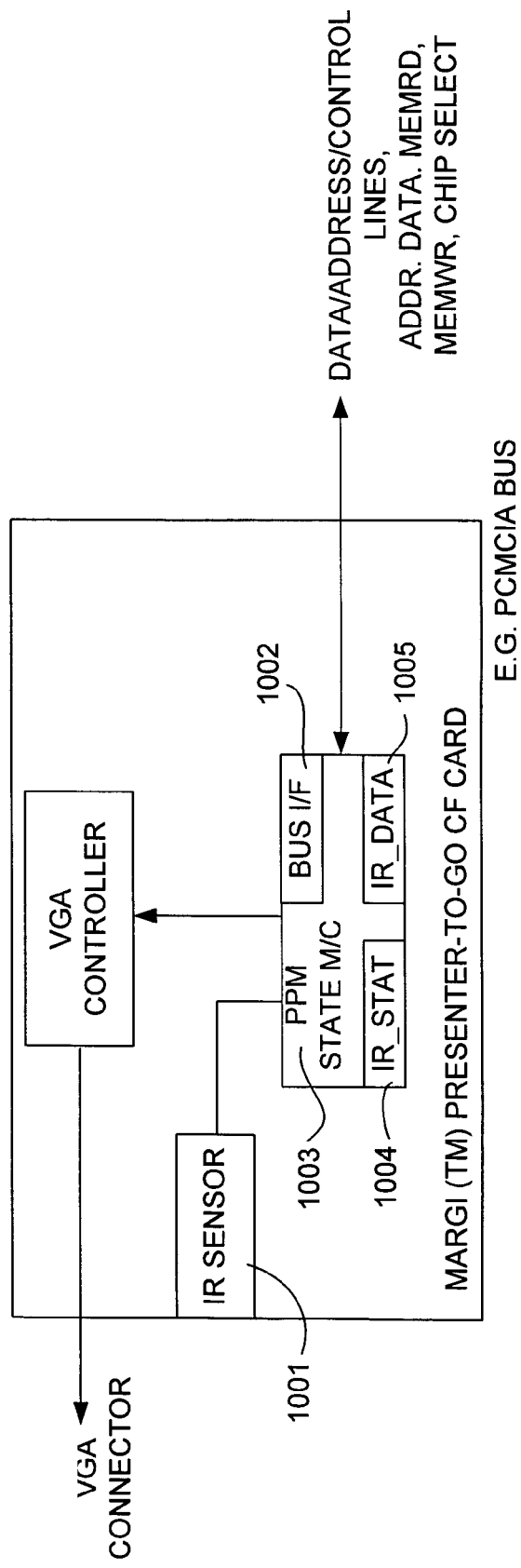
FIGS. 10A and 10B illustrate, in block diagrams, circuitry in a removable card to receive a remote control signal.

In one embodiment, an infrared receiver 1001 in such a removable card 1000 (FIG. 10A) provides PPM (Pulse Period Modulation) inputs to an application specific integrated circuit (ASIC) 1002 which has a state machine 1003 to recover the PPM data as transmitted by the remote control. Receiver 1001 has a wide angle of sensitivity (e.g. 180°) which allows use with any PDA regardless of the size and angle of a window in an IRDA port of the PDA.

ASIC 1002 provides registers similar to those of communication port 22 in a PDA, for capture of data. For example there may be two registers, namely data register 1005 and status register 1004. The data register 1005 of one example is 16 bits wide however, the data resides only on the lower 8 bits of the register. The status register 1004 reports status of the availability (or otherwise) of new data in the data register.

Figure 10B:
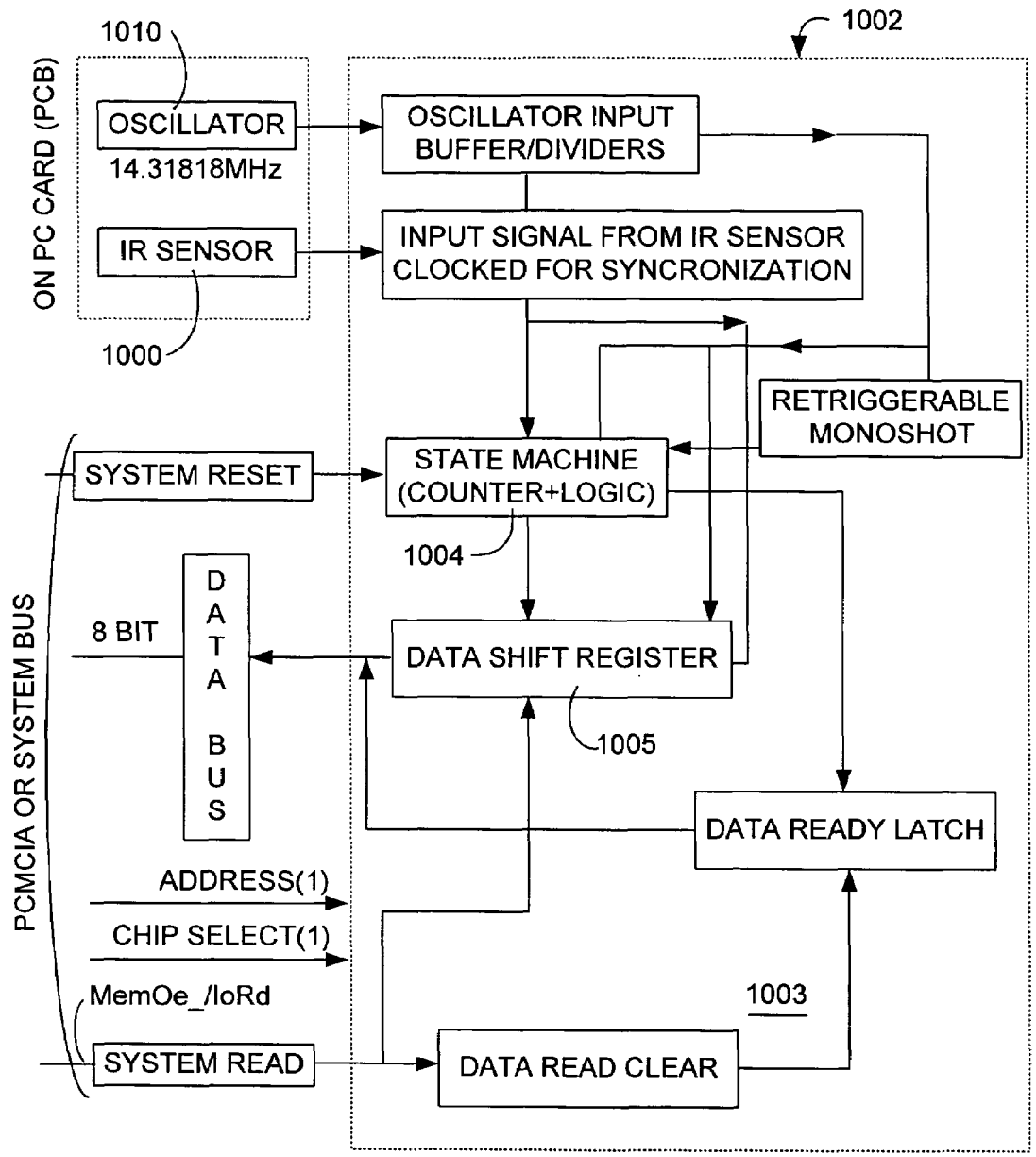

In one specific embodiment of card 1000 (FIG. 10B), control signals from the PCMCIA (or system) bus to the bus interface include: Reset, Address (at least 1 bit), Chip Select_ (at least 1 bit), and MemOe_ (or IoRd_). Moreover, ASIC 1002 generates 8 bit data.

Operation with respect to sensor 1001 is as follows. The input frequency of 14.31818 MHz is buffered and divided to suit the decoding of the IR signal input (with respect to the remote control transmitter's standard). The same input is used for the re-triggerable monostable circuit, used to detect the start pulse. The system reset signal gets the logic to a known state.

As the data comes in from the sensor the state machine (1004) checks for the proper start signal, failing which it initiates the logic for the next signal from the sensor. Once the start pulse is detected the logic looks for the address code (Remote Identifier) and if this is found correct it goes on to collect the data. If not it goes back to the initial state looking for a start bit.

During the data phase when we are decoding the remote control key pressed, the incoming signal is shifted through a register (1005) to load the eight bits. On receiving all eight bits the state machine then sets the latch (1003), which indicates that valid data is available for further operation.

Operation with respect to the PCMCIA (System) bus is as follows. The Chip select and the single bit address is used to access two registers. One (1003) indicates if the data set is ready while the other has the actual data (1005). The system constantly polls the data set ready register (1003) to see if there is any valid data in the shift register. Once the indication is true the system then goes on to reading the actual data from theh data register (1005). When this is done the data ready latch (1003) is reset indicating that the data is "old" enabling the system software to start polling the data set ready register to indicate new valid data when arrives and is properly decoded.

ASIC 1002 can be, for example, a field programmable gate array such as Actel A54SX08A. Oscillator 1010 may generate, for example, a signal oscillating at 14.31818 MHz and may be located on the PC card.

Receiver 1001 can be, for example, Vishay TSOP 1838SS3V modulated at 38 KHz, and used as described in "Photo Modules for PCM Remote Control Systems", Document Number 82052, Rev. 8, 29 Mar. 2001 incorporated by reference herein in its entirety and available from Vishay Semiconductor GmbH, P.O.B. 3535, D-74025 Heilbronn, Germany (and from www.vishay.com).

A description of the state machine 1003 in hardware description language VHDL for one specific example is included in the attached appendix in the file RCDEC.VHP that is incorporated by reference above.

Figure 11:
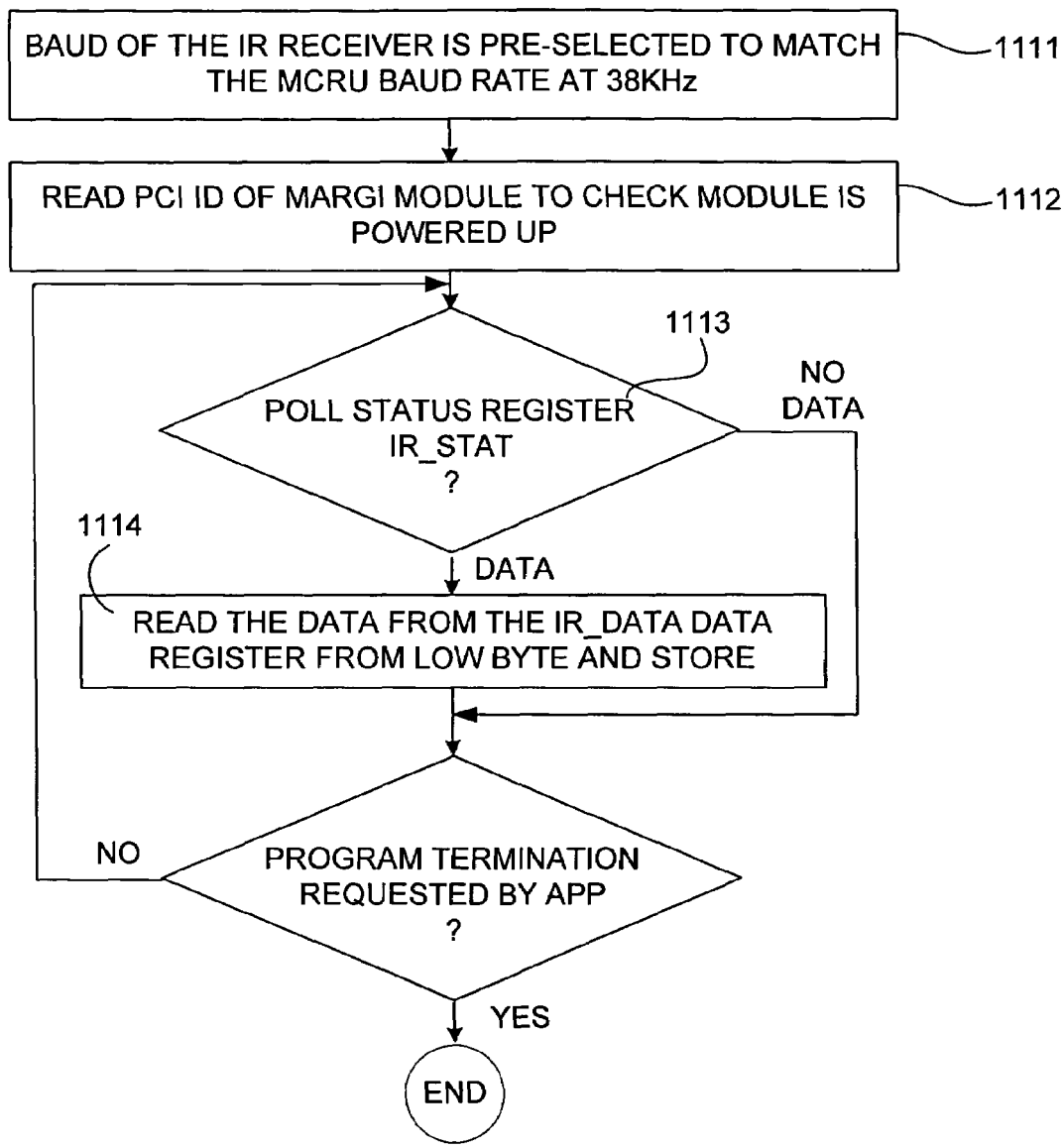
FIG. 11 illustrates a flow chart for use of removable card 1000 in any personal digital assistant.

FIG. 11 illustrates a flow chart for use of removable card 1000 in any PDA which performs the following acts to use card 1000 with any remote control:

Act 1111: Use preset custom baud rate.
Act 1112: Disable Receiver/CTS interrupt.
Act 1113: Poll the IRPort status.
Act 1114: If data available read till no more data available.

Note that in the embodiment illustrated in FIGS. 10 and 11 there is normally no error flagged, because there is no framing error during transmission, reception and decoding of a conventional remote control signal. Even in the absence of a framing error, a microprocessor performs various acts of the type described herein, e.g. to control operation of an application based on a button press on such a remote control. As would be apparent to the skilled artisan, in other embodiments, custom circuitry can be implemented for other protocols, such as 802.11 and Bluetooth.

Although in one embodiment, a signal from a remote control is sensed and decoded in a device having a built-in communication port and a built-in microprocessor, in other embodiments either or both of (communication port, and microprocessor) are not built in. As noted above, in one example, the communication port is built into a card that is insertable into a device containing a microprocessor.

One specific embodiment provides a decoded value of the remote key through a register IR_DATA through a standard interface e.g. PCMCIA to a PDA Handheld's CPU. In contrast, in a conventional television (TV) the signals from a remote control are interfaced directly to the TV circuitry to either change channels or indicate changes in Picture Quality and other Miscellaneous functions in the TV. This application is unique wherein the keystrokes are available to a standard computer interface for use with any application that could use remote controls to driver certain results. In the case of TV it is meant only for one function and i.e. to control TV.

Furthermore, a device 20 of the type described herein in one implementation uses a PDA which can be, for example, any a handheld computing device that fits into a human palm, and has traditional dimensions (e.g. 5" L, 3.5" W, and 0.50"1H). Such devices may use PALM OS or the Microsoft OS e.g (PocketPC 2000 or 2002 or WINCE 3.0 or greater).

Numerous modifications and adaptations of the various embodiments are encompassed by the attached claims.

The invention claimed is:

1. A method of using a device with a remote control, the method comprising:
   saving previous context;
   using a communication port included in the device to receive data via a signal having a compatible physical format and an incompatible data format while ignoring errors from the communication port; and restoring previous context on completion of the act of using.

2. The method of claim 1 further comprising:
   locking use of the communication port prior to the act of using; and
   unlocking use of the communication port subsequent to the act of using.

3. The method of claim 1 wherein, the act of using comprises:
   setting a predetermined baud rate prior to receipt of data.

4. The method of claim 1 wherein, the act of using comprises:
   setting frequency of a baud rate divisor, depending on the speed of a microprocessor included in the device.

5. The method of claim 1 wherein, the act of using comprises: disabling interrupts prior to receipt of data.

6. The method of claim 5 wherein, the act of using further comprises:
   polling status of receipt of data by the communication port.

7. The method of claim 5 wherein, the act of using further comprises:
   enabling interrupts subsequent to receipt of data.

8. The method of claim 7 wherein, the act of using further comprises:
   checking for end of use of remote control prior to the act of enabling.

9. The method of claim 1, where ignoring errors from the communication port comprises using a data set that has been flagged by an error code.

10. The method of claim 1, where ignoring errors from the communication port comprises generating an output in response to a data set and in response to an error flag associated with the data set.

11. A device comprising:
    a communication port for receiving infrared signals, where the communication port is configured to test received signals for compatible data formatting;
    a microprocessor coupled to the communication port; and
    memory coupled to the microprocessor, the memory being encoded with software for the microprocessor to use the communication port to receive data from an infrared signal with an incompatible data format while ignoring errors flagged by the communication port.

12. The device of claim 11 wherein the memory comprises:
    a context store.

13. The device of claim 11 wherein the memory comprises:
    a port lock.

14. The device of claim 11 wherein the memory is further encoded with:
    a port driver to reject data in response to errors flagged by the communication port.

15. The device of claim 11 further comprising:
    a display coupled to the microprocessor; and
    a plurality of keys also coupled to the microprocessor;
    wherein the device has a form factor sufficiently small for the device to be held in the palm of a human.

16. A device comprising:
    a detector configured to detect electromagnetic radiation in a contiguous frequency band;
    a demodulator coupled to the detector, where the demodulator is configured to generate a digital signal in response to a communications signal received by the detector, and where the demodulator is configured to generate error flags in response to digital-format errors in the generated digital signal;
    a microprocessor coupled to the demodulator; and
    memory coupled to the microprocessor, the memory being encoded with software for the microprocessor to receive communicated information from a portion of the digital signal associated with an error flag.

17. The device of claim 16, where the electromagnetic radiation in the contiguous frequency band is one of: a visible optical signal and an infrared signal.

18. The device of claim 16, where the electromagnetic radiation in the contiguous frequency band is an infrared light signal modulated by space-width modulation or pulse-period modulation.

19. The device of claim 16, where the demodulator includes a data buffer for storing demodulated data for the digital signal and an error detector configured to generate the error flags in response to digital-format errors detected in the demodulated data.

20. The device of claim 16, where the demodulator is configured to generate the error flags in response to a portion of the generated digital signal not matching an IrDA format.

21. The device of claim 16, where the error flags include framing-error flags, and where the demodulator is configured to generate the framing-error flags in response to a portion of the generated digital signal having a framing error.

22. The device of claim 16, where the error flags include parity-error flags, and where the demodulator is configured to generate the parity-error flags in response to a portion of the generated digital signal failing a parity check.

* * * * *